United States Patent
Lodrige et al.

(10) Patent No.: US 6,691,175 B1
(45) Date of Patent: Feb. 10, 2004

(54) METHOD AND APPARATUS FOR MANAGING DATA PROPAGATION BETWEEN SOFTWARE MODULES

(75) Inventors: Paul F. Lodrige, Palo Alto, CA (US); Randy S. Fishel, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/513,705

(22) Filed: Feb. 25, 2000

(51) Int. Cl.$^7$ .................................................. G06F 9/46
(52) U.S. Cl. ........................................ 709/314; 709/102
(58) Field of Search ................................ 709/321, 322, 709/314, 323, 324, 327, 310, 318, 102, 103, 106

(56) References Cited

U.S. PATENT DOCUMENTS

| | | |
|---|---|---|
| 3,686,641 A | 8/1972 | Logan et al. |
| 4,847,754 A | 7/1989 | Obermarck et al. |
| 5,404,562 A | 4/1995 | Heller et al. |
| 5,465,335 A * | 11/1995 | Anderson ............... 709/107 |
| 5,519,833 A * | 5/1996 | Agranat et al. ......... 709/231 |
| 5,944,778 A * | 8/1999 | Takeuchi et al. ........ 709/100 |
| 6,408,324 B1 * | 6/2002 | Wallace et al. ......... 709/107 |

OTHER PUBLICATIONS

Sun Microsystems, Inc. "Solaris 2.6 Software Developer Collection vol. 1, Streams Programming Guide," docs.sun.com, 1994–1999.

* cited by examiner

*Primary Examiner*—John Follansbee
*Assistant Examiner*—The Thanh Ho
(74) *Attorney, Agent, or Firm*—Beyer Weaver & Thomas, LLP (57) ABSTRACT

Improved techniques for managing propagation of data through software modules used by computer systems are disclosed. The improved techniques can be implemented to manage the propagation of data through software modules used by computer systems. More particularly, the improved techniques obtain improved propagation of data messages to and from synchronization queues which back up main queues associated with the software modules. A segregated synchronization queue which allows segregation of data pertaining to events from data that does not pertain to events. In addition, data can be organized and processed in accordance with different priority levels.

23 Claims, 8 Drawing Sheets

METHOD AND APPARATUS FOR MANAGING DATA PROPAGATION BETWEEN SOFTWARE MODULES

CROSS-REFERENCE TO RELATED APPLICATIONS

This application is related to U.S. patent application Ser. No. 09/513,706, entitled "METHOD AND APPARATUS FOR CONCURRENT PROPAGATION OF DATA BETWEEN SOFTWARE MODULES", filed concurrently herewith, and hereby incorporated herein by reference.

BACKGROUND OF THE INVENTION

1. Field of the Invention

The present invention relates to computing systems and, more particularly, to data communications for computing systems.

2. Description of the Related Art

Recent developments in data communication for computing systems have software modules in a layered model. One feature of UNIX System V uses a layered model of software modules, referred to herein as the STREAMS model. The STREAMS model provides a standard way of dynamically building and passing messages through software modules that are placed in layers in a protocol stack. In the STREAMS programming model, the protocol stack can be dynamically changed, e.g., software modules can be added or removed (pushed and popped) at run-time. Broadly speaking, a "stream" generally refers to an instance of a full-duplex path using the model and data communication facilities between a process in user space and a driver which is typically located within the kernel space of the computing system. In other words, a stream can be described as a data path that passes data in both directions between a stream driver in the kernel space and a process in user space.

Figure 1:
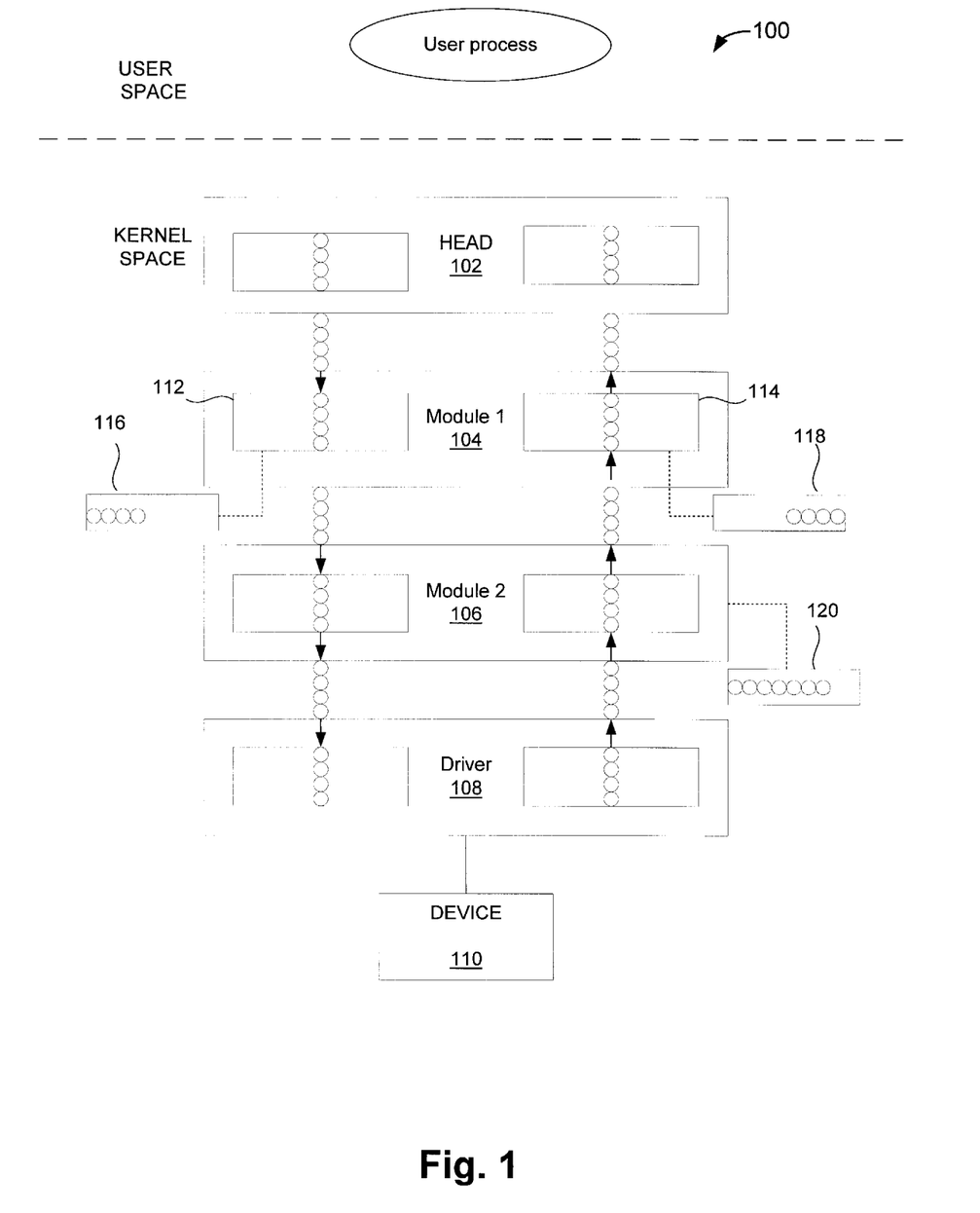
FIG. 1 illustrates a STREAMS programming environment including a stream head, two stream modules, and a streams driver.

FIG. 1 illustrates a STREAMS programming environment 100 including a stream head 102, stream modules 104 and 106, and a streams driver 108. An application program can create a "stream" by opening a device 110. Initially, the stream includes only the stream head 102 and stream driver 108. The stream head 102 is the end of the stream closet to the user process and serves as a user interface between the stream and the user process. Similarly, the stream driver 108 is the end of the stream closest to the device 110 and transfers data between the kernel and the device 110.

After the stream head 104 and stream driver 108 are provided, one or more stream modules, such as stream modules 104 and 106, can be pushed on the stream between the stream head 102 and stream driver 108. An application can dynamically add or remove (push or pop) stream modules on the stream stack at run-time. Each of the stream modules 104 and 106 includes a defined set of kernel-level routines and data structures to process data that passes through these modules. For example, stream modules can operate to convert lower case to upper case, or to add network routing information, etc.

As depicted in FIG. 1, each of the stream head 102, the stream modules 104 and 106, and the stream driver 108 has a pair of queues that can be used as containers for holding messages (e.g., data) traveling upstream or downstream over the stream. For example, a down-queue 112 and a up-queue 114 hold blocks of messages (data) for the stream module 104 and respectively pass the data up the stream to the stream head 102 or down the stream to the stream driver 108. The messages can be ordered within the queues 112 and 114 in first-in first-out basis (FIFO), perhaps according to assigned priorities.

It should be noted that in some situations messages cannot be placed in queues 112 and 114. For example, when a stream queue has reached it allotted size, messages can no longer be placed in that queue. As another example, messages cannot be placed in the queues 112 and 114 when other processing threads have acquired their software locks. In such cases, messages are stored in another queue that can serve as a back-up queue, herein referred to as a "synchronization queue". For example, synchronization queues 116 and 118 depicted in FIG. 1, respectively hold messages that could not be placed into the queues 112 and 114. It should be noted that in the STREAMS model, some stream modules (e.g., Internet Protocol (IP) module) are confined to having only one synchronization queue. As a result, for some stream modules there is only one synchronization queue available to serve as a backup queue. For example, a synchronization queue 120 which is used to hold the messages for the second software module 106.

One problem with conventional implementations of the STREAMS model is that messages are intermixed in one synchronization queue regardless of their type. As will be appreciated by those skilled in the art, some of the messages held in synchronization queue 116 and 118 contain data pertaining to operational events (events) that may effect the flow of data and/or how data is to be processed. For example, one such operational event may be related to changing the path of data flow to facilitate re-routing messages through a different physical router. Typically, data pertaining to operational events needs to be processed before other data in the synchronized queue can be processed. However, since data pertaining to operational events is intermixed with data not pertaining to any operational events, the conventional models do not provide an efficient mechanism for identifying and processing data pertaining to events.

Another problem with conventional implementations of the STREAMS model is that there is no mechanism for arranging or prioritizing data held in a synchronized queue. All messages are maintained in one synchronized queue regardless of their relative importance. As a result, messages with less importance may be processed by a high priority processing thread. Thus, the conventional models do not provide an effective mechanism to process data held in synchronized queues in accordance to the relative importance of the data.

In view of the foregoing, there is a need for improved methods for managing data propagation between software modules.

SUMMARY OF THE INVENTION

Broadly speaking, the invention relates to techniques for managing propagation of data through software modules used by computer systems. More particularly, the invention obtains improved propagation of data (namely, messages to and from synchronization queues which back up main queues associated with the software modules). In one aspect, the invention provides a segregated synchronization queue which allows segregation of data pertaining to events from data that does not pertain to events. In accordance with another aspect, data can be organized within a synchronization queue and processed in accordance with priorities. The invention is particularly well suited for use with the STREAMS model that uses software models arranged in a stack to provide data communications.

The invention can be implemented in numerous ways, including a system, an apparatus, a method or a computer readable medium. Several embodiments of the invention are discussed below.

As a synchronization queue for a computer system one embodiment of the invention includes: a first synchronization queue container suitable for storing one or more message blocks while the one or more message blocks are awaiting to be processed, and the one or more first message blocks of the first synchronization queue container being arranged in accordance with a first desired order; a second synchronization queue container suitable for storing one or more message blocks while the one or more message blocks are awaiting to be processed, and the one or more second message blocks of the second synchronization queue container being arranged in accordance with a second desired order; and a synchronization queue header providing reference to at least the first and second synchronization queue containers.

As a method for managing flow of messages between a first layer software module and a second layer software module with the first and second layer software modules being arranged in a layered stack, one embodiment of the invention includes the acts of: determining whether a message pertains to an operational event; placing the message in an event queue associated with the first layer software module when it is determined that the message pertains to an operational event; and placing the message in an appropriate data queue associated with the first layer software module when it is determined that the message does not pertain to an operational event.

As a computer readable media including computer program code for managing flow of messages between a first software module and a second software module, one embodiment of the invention includes: computer program code for determining whether a message pertains to an operational event; computer program code for placing the message in an event queue associated with the first software module when it is determined that the message pertains to an operational event; and computer program code for placing the message in an appropriate data queue associated with the first software module when said computer program code for determining has determined that the message does not pertain to an operational event.

The advantages of the invention are numerous. Different embodiments or implementations may have one or more of the following advantages. One advantage of the invention is that, within synchronization queues, data pertaining to events can be segregated from data that does not pertain to events. Another advantage of the invention is that data within synchronization queues can be organized and/or processed in accordance with desired priorities. Yet another advantage is that more efficient organization and propagation of data can be achieved.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention pertains to techniques for managing propagation of data through software modules used by computer systems. More particularly, the invention obtains improved propagation of data (namely, messages to and from synchronization queues which back up main queues associated with the software modules). In one aspect, the invention provides a segregated synchronization queue which allows segregation of data pertaining to events from data that does not pertain to events. In accordance with another aspect, data can be organized within a synchronization queue and processed in accordance with priorities. The invention is particularly well suited for use with the STREAMS model that uses software models arranged in a stack to provide data communications.

Embodiments of the invention are discussed below with reference to FIGS. 2–6B. However, those skilled in the art will readily appreciate that the detailed description given herein with respect to these figures is for explanatory purposes as the invention extends beyond these limited embodiments.

Figure 2:
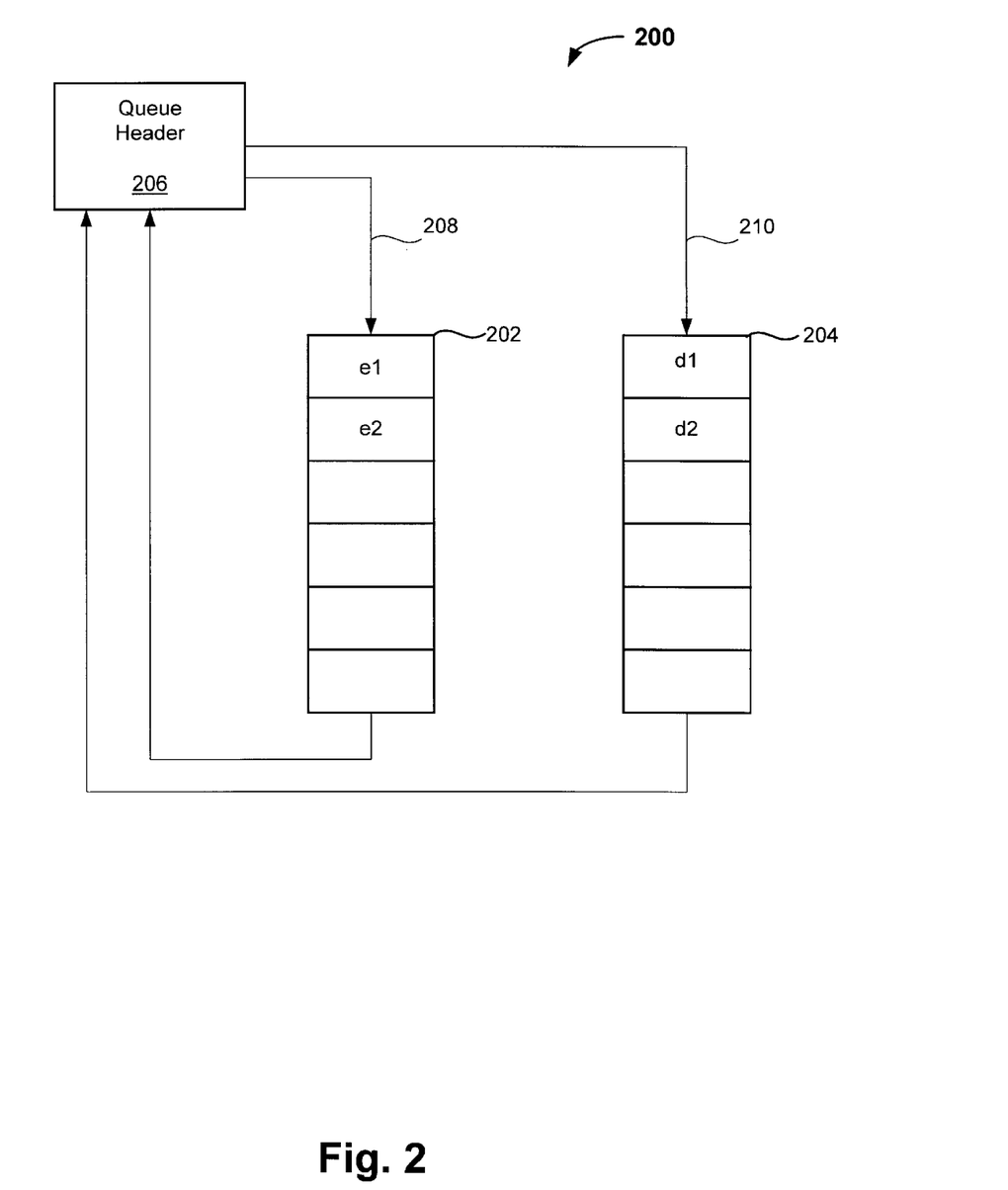
FIG. 2 illustrates an exemplary segregated synchronization queue in accordance with one embodiment of the invention.

FIG. 2 illustrates an exemplary segregated synchronization queue 200 in accordance with one embodiment of the invention. The segregated synchronization queue 200 can be used by a software module (e.g., a streams module) to hold messages that are to be processed and passed to a subsequent software module in a layered software stack. As shown in FIG. 2, the segregated synchronization queue 200 includes an event queue container 202, a data queue container 204, and a queue header 206. The event queue container 202 is used to hold messages (data blocks) pertaining to events that are pending (e.g., e1, e2), such messages are referred to as event messages. The data queue container 204, however, holds messages that do not pertain to events, (e.g., d1, d2), such messages are referred to as data messages. As will be appreciated by those skilled in the art, the segregated synchronization queue 200 provides the ability to maintain messages pertaining to events in a separate queue container from messages that only pertain to data and thus not to events. As a result more efficient organization and/or processing of data can be achieved. For example, the segregated synchronization queue 200 eliminates the need to perform sequential searches to find any events that maybe pending in the synchronization queue before data is propagated. Thus, events can be identified more quickly to allow more efficient servicing of events as well as propagation of data. In addition, the queue header 206 provides a reference 208 to the beginning of the event queue container 202. Similarly, the queue header 206 provides a reference 210 to the beginning of the data container queue 204. The bottom of each of the containers 202 and 204 can reference back to the queue header 206.

Figure 3:
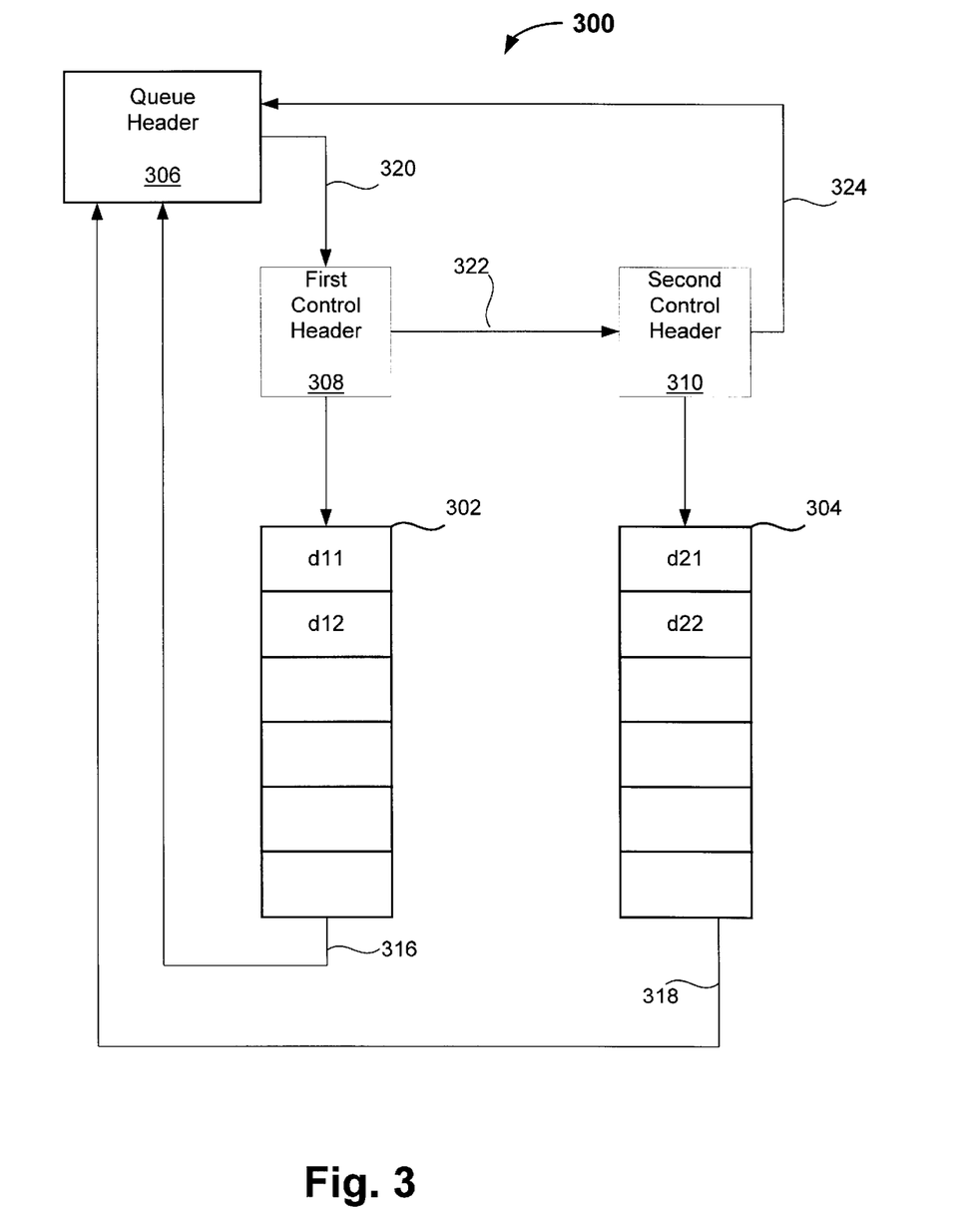
FIG. 3 illustrates an exemplary segregated synchronization queue in accordance with another embodiment of the invention.

FIG. 3 illustrates an exemplary segregated synchronization queue 300 in accordance with another embodiment of the invention. The segregated synchronization queue 300 can be used by a software module (e.g., a streams module) to hold messages that are to be processed and passed to a subsequent software module in a layered software stack. As shown in FIG. 3, the segregated synchronization queue 300 includes first and second data queue containers 302 and 304, a queue header 306, and first and second control headers 308 and 310. The first and second data queue containers 302 and 304 can hold messages which are to be processed and passed along to a subsequent software module in the layered software stack. As will be appreciated by those skilled in the art, the segregated synchronization queue 300 provides the ability to maintain messages in either of the first and second data queue containers 302 and 304. Thus, allowing the data queue containers 302 and 304 to be organized in a list of data queue containers. As will be appreciated by those skilled in the art, a hashing algorithm can be used to build and maintain the list of data queue containers. The first and second control headers 308 and 310 respectively provide a reference 312 to the first data queue container and a reference 314 to the second data queue container. The ends of first and second data queue containers 302 and 304 can respectively provide references 316 and 318 back to the queue header 306. In addition, the queue header 306 can provide a reference 320 to the first control header 308. The first control header 308 can provide a reference 322 to the second control header 310. The second control header 310 can provide a reference 324 back to the queue header 306. Accordingly, a list of data queue containers can be formed and efficiently traversed using control headers. The list of data queue containers only provides two data queue containers. sever, as will be appreciated by those skilled in the art, the list of data queue containers can be arranged in accordance with a desired preference and can be dynamically altered to add or remove data queue containers (such as at run-time or otherwise). As an example, a list of data queue containers can be arranged to signify different processing priorities assigned to the data queue containers. For example, with respect to FIG. 3, the first data queue container 302 can store high priority messages, while the second data queue container 304 can store low priority messages. As a result, the synchronization queue allows for a more desirable propagation of data. For example, unlike the conventional models which intermixed data in a common queue, undesirable propagation of lower priority data by a high priority process (or thread) is easily avoided by the invention.

Figure 4:
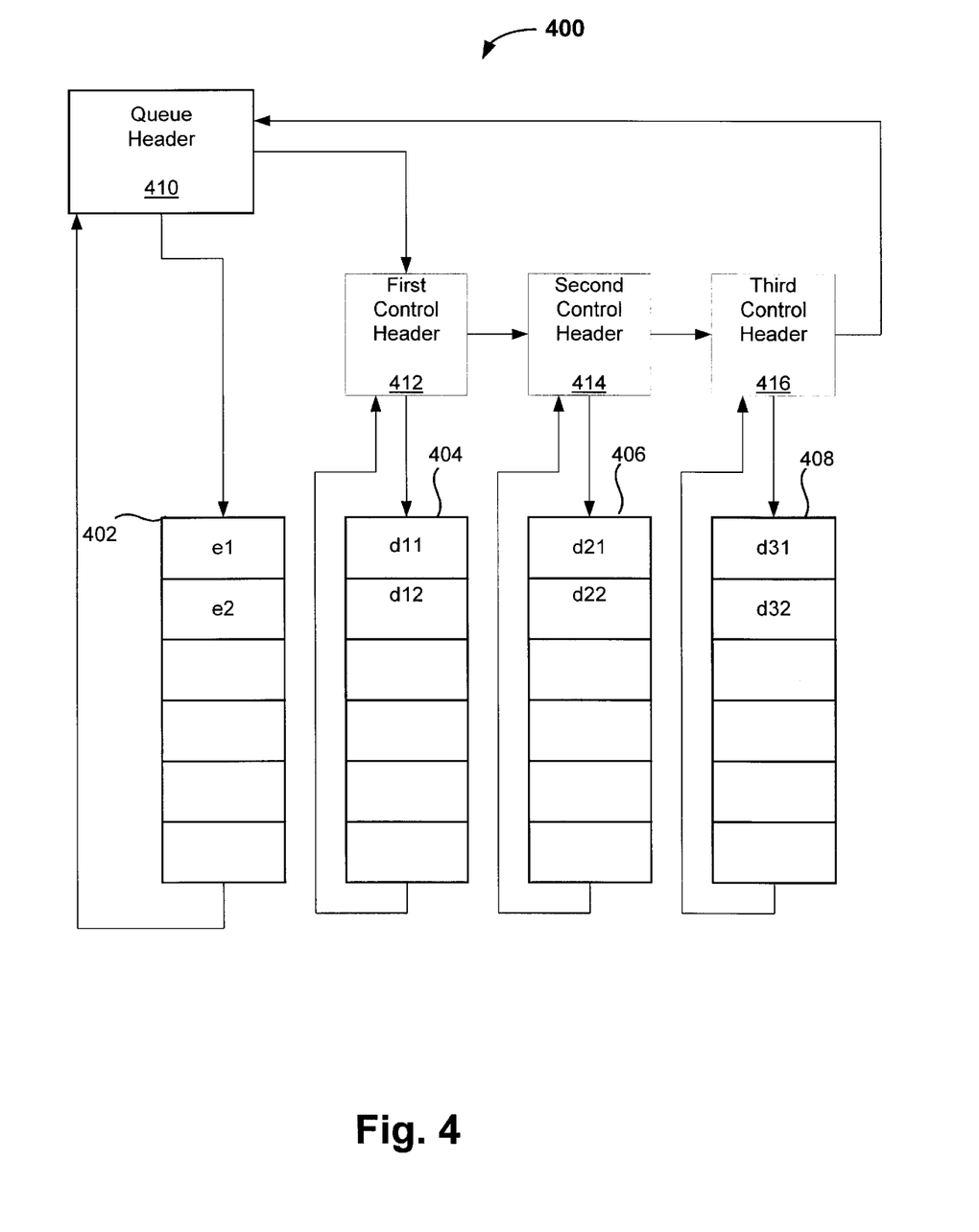
FIG. 4 illustrates an exemplary segregated synchronization queue in accordance with yet another embodiment of the invention.

FIG. 4 illustrates an exemplary segregated synchronization queue 400 in accordance with yet another embodiment of the invention. The segregated synchronization queue 400 can be used by a software module (e.g., a streams module) to hold messages that are to be processed and passed to a subsequent software module in a layered software stack. As shown in FIG. 4, the segregated synchronization queue 400 includes an event queue container 402, first, second, and third data queue containers 404, 406, and 408, a queue header 410, and first, second, and third control headers 412, 414 and 416. As will be appreciated by those skilled in the art, similar to the segregated synchronization queue 200 of FIG. 2, the segregated synchronization queue 400 provides the ability to maintain data pertaining to events in a separate queue container, namely, the event queue container 402. In addition, similar to the segregated synchronization queue 300 of FIG. 3, the segregated synchronization queue 400 allows the data queue containers 404, 406 and 408 to be organized in a list of data queue containers and thus provide different processing priorities for the messages stored therein. Similar to control headers discussed above with respect to FIG. 2, the first, second, and third control headers 412, 414 and 416 can respectively provide references to the data queue containers 404, 406 and 408.

Figure 5:
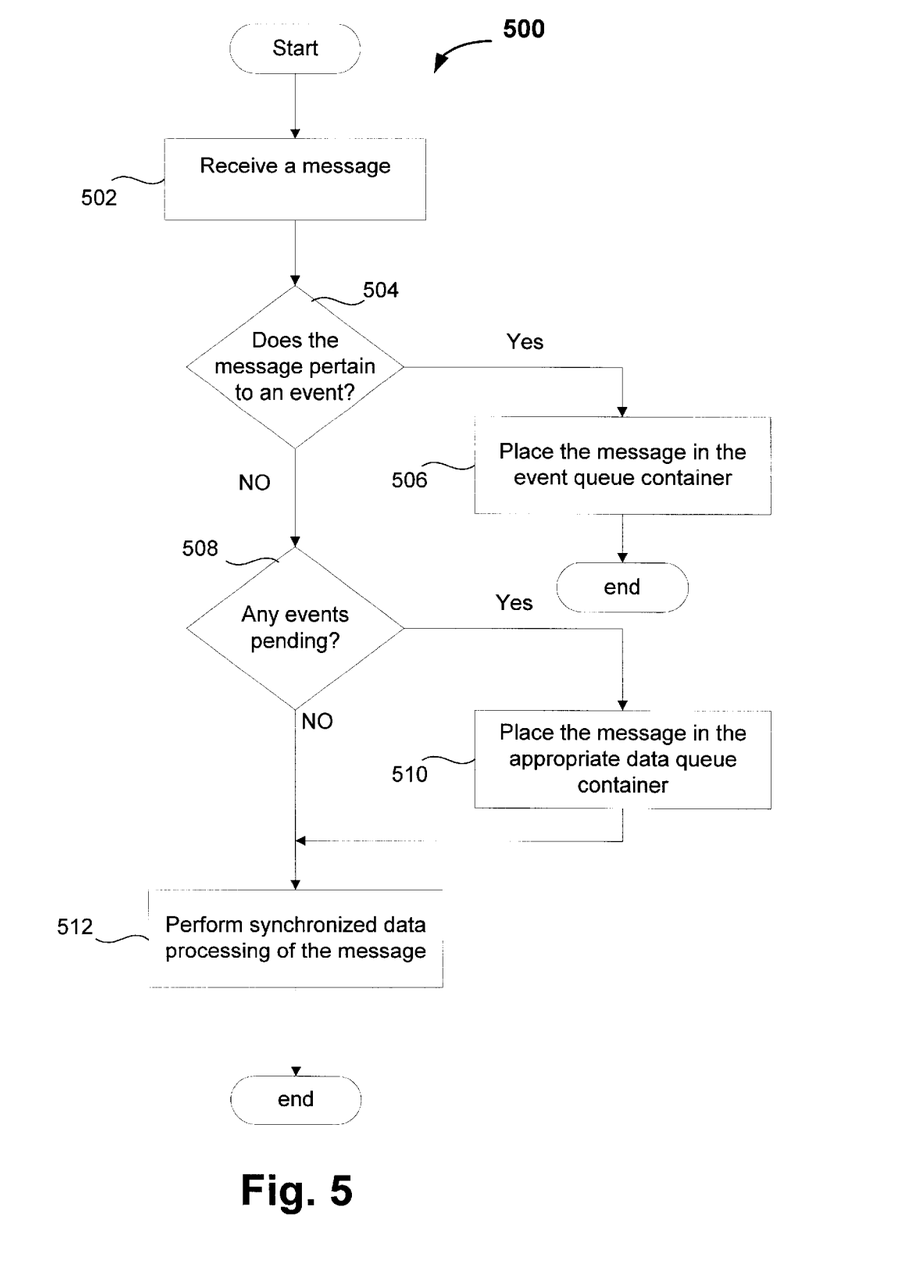
FIG. 5 illustrates a data flow management method according to one embodiment of the invention.

FIG. 5 illustrates a data flow management method 500 configured according to one embodiment of the invention. The data flow management method 500 manages flow of messages between two or more software modules configured in a stack. The data flow management 500 can be implemented to utilize a segregated synchronized queue to facilitate temporary storage, processing and passing of messages by one software module to another software module. In this embodiment, it is assumed that the segregated synchronization queue has an event queue container and a plurality of data queue containers. Initially, at operation 502, a message is received by the software module. This message is to be processed and passed to a subsequent software module in the stack of software modules. At operation 504, a determination is made as to whether the message pertains to an event. For example, this determination can be made by checking the header for the message. If the message pertains to an event, the message is placed in the event queue container of the segregated synchronized queue, as noted in operation 506. It should be noted that in this situation the message is not passed to the next software module, and the data flow management method 500 ends after operation 506.

On the other hand, if it is determined at operation 504 that the message does not pertain to an event, then the data flow management 500 proceeds to operation 508 where a determination is made as to whether any events are pending. The determination in operation 508 can be efficiently performed by checking the event queue container of the segregated synchronized queue to determine whether the event queue container contains an event. Typically, the message should not be processed and/or passed to the next software module when events are pending. Accordingly, as noted in operation 510, if one or more events are pending, the message is queued in an appropriate data queue container for future processing. It should be noted that the data queue containers can be organized based on priority levels. Accordingly, the appropriate data queue for the message container can be build or located (if already exists). Thus, allowing the message to be placed in the appropriate one of the data queue containers in accordance with the priority assigned to the message.

However, if it is determined at operation 508 that there are no events pending, the data flow management 500 proceeds to operation 512 where synchronized data processing of the message is performed. The synchronized data processing is performed by (or under the control of) the software module. It should be noted that the processing performed in operation 512 may result in passing the message to the next software module. Alternatively, the processing performed in operation 512 may result in the message being queued in a data queue container and/or another message previously queued in the data queue container being passed to the software module in the next level. The operation 512 is described in greater detail below with respect to FIGS. 6A and 6B for one embodiment of the invention.

Figure 6A:
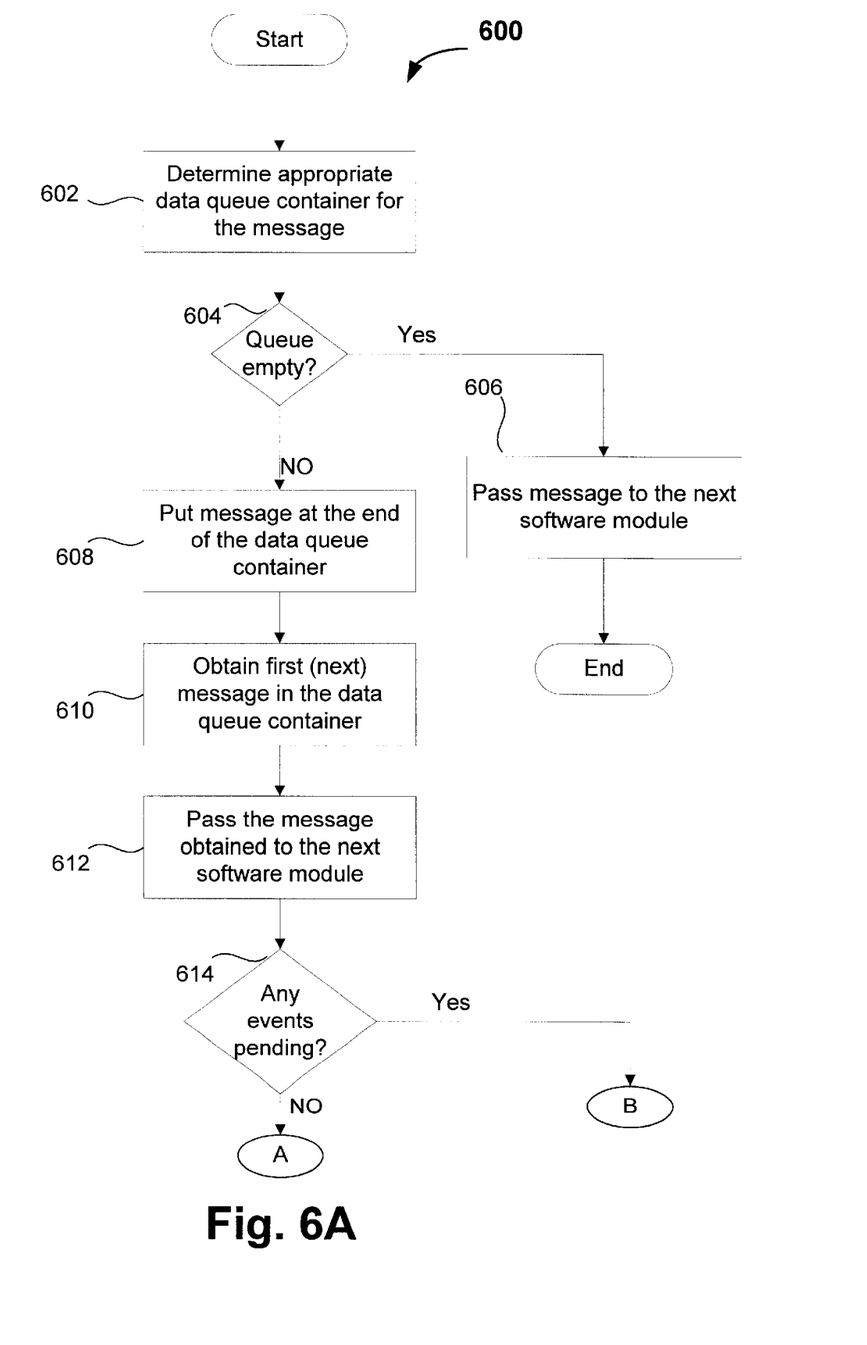
FIGS. 6A and 6B illustrate a synchronized data processing method according to one embodiment of the invention.
Figure 6B:
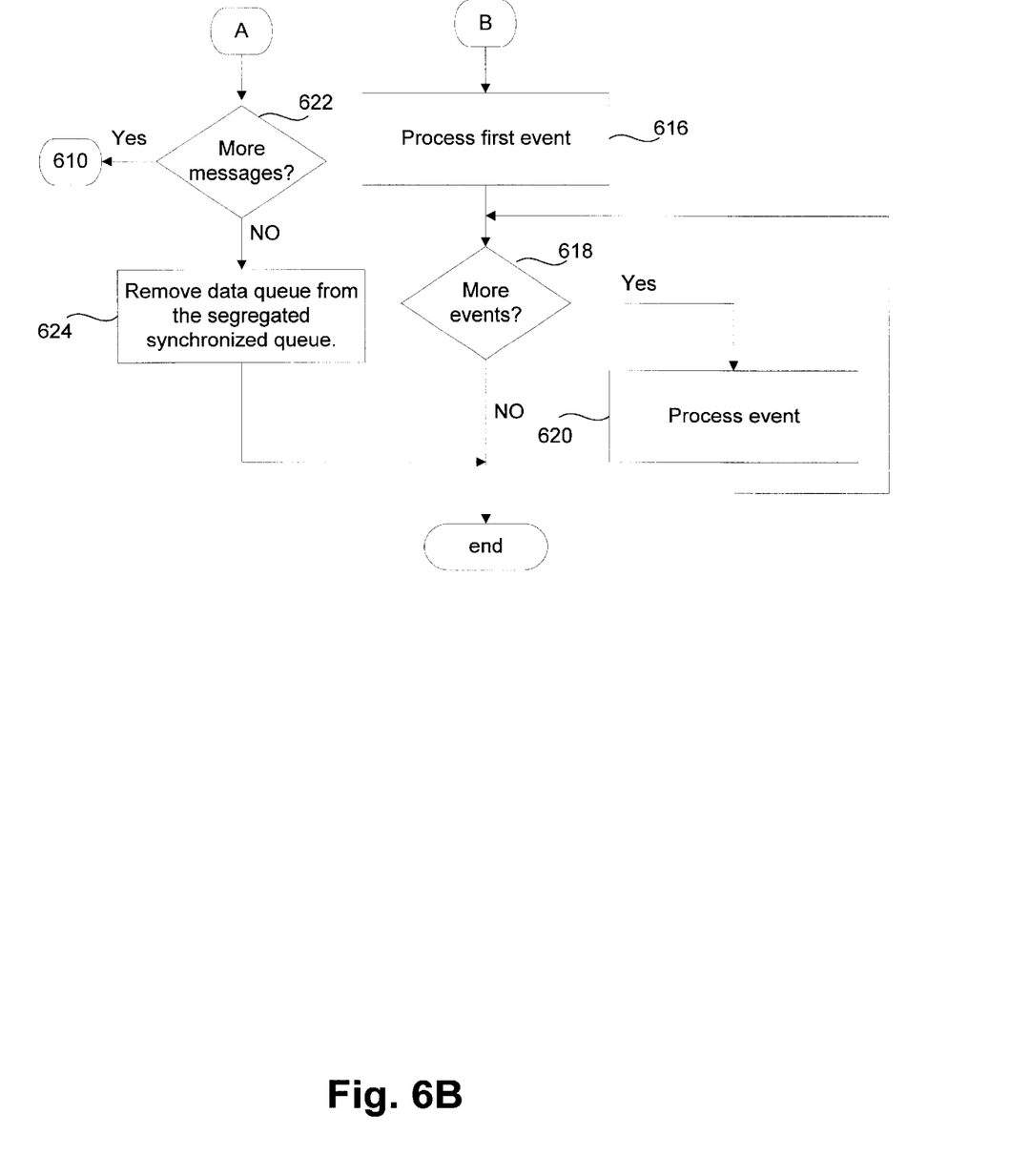

FIGS. 6A and 6B illustrate a synchronized data processing method 600 according to one embodiment of the invention. The synchronized data processing method 600 processes messages within a segregated synchronized queue. The synchronized data processing method 600 can be implemented to facilitate processing and passing of data between software modules. It should be noted that the message is a data message and thus does not pertain to an event. After the data message is processed by a current software module, the data message is passed to another software module at an appropriate time. The synchronized data processing method 600 represents the processing that can be performed in operation 512 of FIG. 5, according to one embodiment of the invention. Like FIG. 5, the synchronized data processing method 600 can be implemented using a segregated synchronized queue having an event queue container and a plurality of data queue containers.

Initially, at operation 602, the appropriate data queue container for the message being processed is determined. In one implementation, each of the data queue containers pertains to a different priority level. A variety of algorithms, such as hashing algorithms can be utilized to build, maintain and search a list of data queue containers to determine the appropriate one of the data queue containers for the message. Next, at operation 604, a determination is made as to whether the appropriate data queue container for the message is empty. In other words, the determination at operation 604 determines whether there is one or more messages already queued in the data queue container appropriate for the message. If the data queue container is empty, the message can be passed to the next software module as noted in operation 606. The synchronized data processing method 600 then ends following operation 606.

On the other hand, if the operation 604 determines that the appropriate data queue container is not empty, the synchronized data processing method 600 proceeds to operation 608 where the message is placed at the end of the appropriate data queue container. Next, at operation 610, the first message in the data queue container is obtained. The first message obtained from the data queue container is then passed to the next software module as noted by operation 612. After the message has been passed to the next software module, a determination is made at operation 614 as to whether any events are pending in the event queue container. It should be noted that an event could have been posted in the event queue container by another thread (or process) than the thread (or process) performing the processing of the synchronized data processing method 600.

Accordingly, the synchronized data processing method 600 proceeds to operation 616 if it is determined at operation 614 that the event queue container contains one or more events. At operation 616, a first event in the event queue container is performed. Next, at operation 618, a determination is made as to whether there are more events pending in the event queue container. If there are one or more events still pending they can be processed by operation 620 until all the events in the event queue container have been processed. When there are no more events in the event queue container, the synchronized data processing method 600 ends.

Alternatively, if the determination at operation 614 determines that there are no events pending, the synchronized data processing method 600 proceeds to operation 622 where a determination is made as to whether there are more messages queued in the data queue container. When there are no more messages in the data queue container, the data queue container can be removed from the list of data queue containers of the segregated synchronized queue at operation 624. Following the operation 624, the synchronized data processing method 600 ends. On the other hand, if there are more messages in the data queue container, the synchronized data processing method 600 proceeds back to operation 610 where the next message is obtained from the head of the data queue container.

Figure 7A:
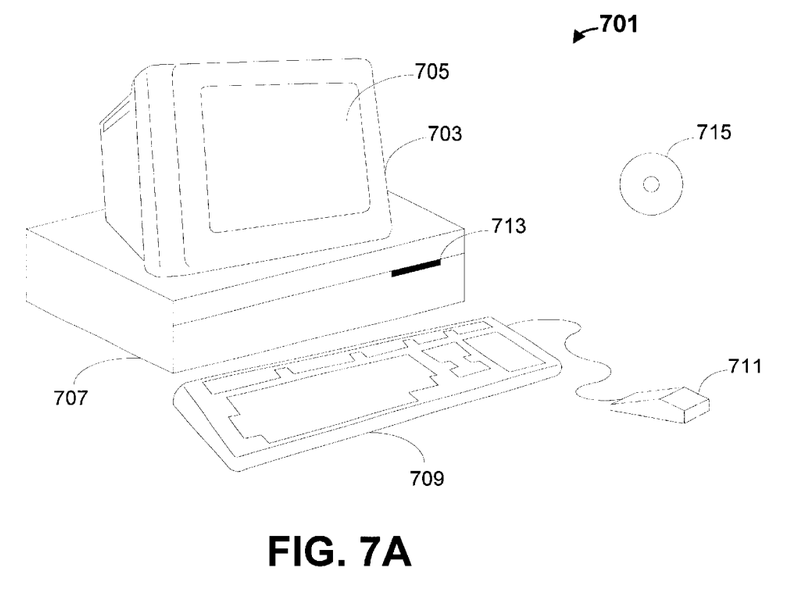
FIGS. 7A and 7B illustrate an example of a computer system that may be used in accordance with the invention.
Figure 7B:
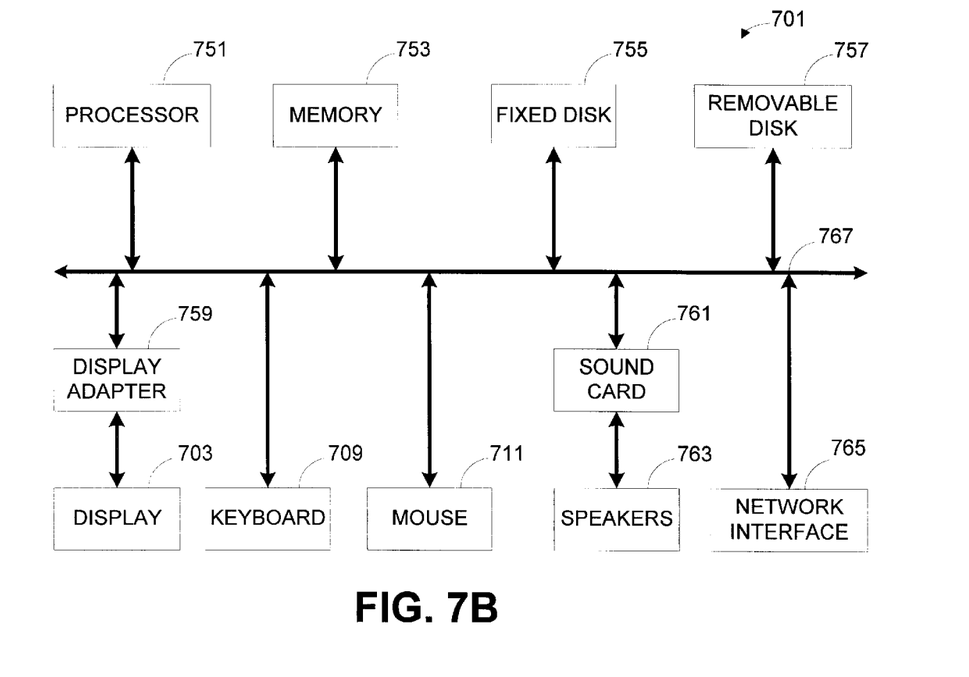

FIGS. 7A and 7B illustrate an example of a computer system that may be used in accordance with the invention. FIG. 7A shows a computer system 701 that includes a display 703, screen 705, cabinet 707, keyboard 709, and mouse 711. Mouse 711 may have one or more buttons for interacting with a graphical user interface. Cabinet 707 houses a CD-ROM drive 713, system memory and a hard drive (see FIG. 7B) which may be utilized to store and retrieve software programs incorporating computer code that implements the invention, data for use with the invention, and the like. Although CD-ROM 715 is shown as an exemplary computer readable storage medium, other computer readable storage media including floppy disk, tape, flash memory, system memory, and hard drive may be utilized. Additionally, a data signal embodied in a carrier wave (e.g., in a network including the Internet) may be the computer readable storage medium. In one implementation, an operating system for the computer system 701 is provided in the system memory, the hard drive, the CD-ROM 715 or other computer readable storage medium and serves to incorporate the computer code that implements the invention.

FIG. 7B shows a system block diagram of computer system 701 used to execute the software of an embodiment of the invention. As in FIG. 7B, computer system 701 includes monitor 703 and keyboard 709, and mouse 711. Computer system 701 further includes subsystems such as a central processor 751, system memory 753, fixed storage 755 (e.g., hard drive), removable storage 757 (e.g., CD-ROM drive), display adapter 759, sound card 761, speakers 763, and network interface 765. The central processor 751, for example, can execute computer program code (e.g., an operating system) to implement the invention. An operating system is normally, but necessarily) resident in the system memory 753 during its execution. Other computer systems suitable for use with the invention may include additional or fewer subsystems. For example, another computer system could include more than one processor 751 (i.e., a multi-processor system) or a cache memory.

The system bus architecture of computer system 701 is represented by arrows 767. However, these arrows are illustrative of any interconnection scheme serving to link the subsystems. For example, a local bus could be utilized to connect the central processor to the system memory and display adapter. Computer system 701 shown in FIG. 7B is but an example of a computer system suitable for use with the invention. Other computer architectures having different configurations of subsystems may also be utilized.

The invention can use a combination of hardware and software components. The software can be embodied as computer readable code (or computer program code) on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

The advantages of the invention are numerous. Different embodiments or implementations may have one or more of the following advantages. One advantage of the invention is that, within synchronization queues, data pertaining to events can be segregated from data that does not pertain to events. Another advantage of the invention is that data within synchronization queues can be organized and/or processed in accordance with desired priorities. Yet another advantage is that more efficient organization and propagation of data can be achieved.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A synchronization queue for managing flow of messages between a first layer software module and a second layer software module, the first and second layer software modules being arranged in a layered stack, the synchronization queue comprising:

a first synchronization queue container suitable for storing one or more message blocks while the one or more message blocks are awaiting to be processed by a main queue that is used for processing messages between two software modules, the one or more first message blocks of the first synchronization queue container being arranged in accordance with a first desired order for dynamic processing within the first synchronization queue, wherein the first synchronization queue is used to store and process only message blocks relating to operational events associated with managing flow of data between the first layer software module and a second layer software module;

a second synchronization queue container suitable for storing one or more message blocks while the one or more message blocks are awaiting to be processed by the main queue used for processing messages between the two software modules, and the one or more second message blocks of the second synchronization queue container being arranged in accordance with a second desired order for dynamic processing within the second synchronization queue, and wherein the second synchronization queue is not used to store any message blocks relating to operational events; and a synchronization queue header providing reference to at least the first and second synchronization queue containers.

2. A data synchronization queue as recited in claim 1, wherein the one or more first message blocks of the first syncrhonization queue container are message blocks that are to be propagated through one or more software modules.

3. A data synchronization queue as recited in claim 2, wherein the one or more first software modules are stream modules located within a kernel space.

4. A data synchronization queue as recited in claim 3, wherein the one or more software modules are an Internet protocol (IP).

5. A data synchronization queue as recited in claim 1,
    wherein the synchronization queue further comprises: a queue control header providing two or more control references to at least the first and second synchronized queue containers, the two or more control references being arranged in accordance with a desired order, wherein each of the first and second synchronized queue containers is referenced by at least one control reference, and wherein the synchronization queue header provides reference to the first and second synchronization queue containers by referencing the queue control header.

6. A data synchronization queue as recited in claim 5, wherein the two or more references are arranged in accordance with respective assigned priorities.

7. A method for managing flow of messages between a first layer software module and a second layer software module, the first and second layer software modules being arranged in a layered stack, said method comprising;

(a) determining whether a message pertains to an operational event;

(b) placing the message in an event queue portion of a synchronization queue associated with the first layer software module when said determining (a) determines that the message pertains to an operational event, wherein said synchronization queue is suitable for storing one or more message blocks while the one or more message blocks are awaiting to be processed by a main queue, and wherein the event queue is used to store only messages relating to operational events and are arranged for dynamic processing within the event queue portion; and (c) placing the message in an appropriate data queue portion of the synchronization queue associated with the first layer software module when said determining (a) determines that the message does not pertain to an operational event, and wherein the data queue portion is used to store for dynamic processing within the data queue portion only messages that are to be propagated between the first and second software modules.

8. A method as recited in claim 7, wherein said placing (c) further comprises:

determining the appropriate data queue to place the message; and placing the message at the end of the appropriate data queue.

9. A method as recited in claim 7, wherein said method further comprises:

determining whether the appropriate data queue is empty;

passing the message to the second layer software module when the determining determines that the appropriate data queue is empty; and placing the message at the end of the appropriate data queue when the determining determines that the data queue is not empty.

10. A method as recited in claim 9, wherein said method further comprises:

obtaining a first message from the appropriate data queue; and passing the first message the second layer software module.

11. A method as recited in claim 7, wherein said method further comprises:

obtaining a first message from the appropriate data queue; and passing the first message to the second layer software module.

12. A method as recited in claim 11, wherein said method further comprises:

determining whether an event has been posted in the event queue after the first message has been passed to the second layer software module; and processing one or more events when the determining whether an event has been posted in the event queue determines that an event has been posted.

13. A method as recited in claim 9, wherein said method further comprises:

determining whether another message is in the appropriate data queue after the message in the appropriate data queue is sent to the second layer software module; and passing the another message from the appropriate data queue to the second layer software module when the determining determines that the another message is in the appropriate data queue.

14. A method as recited in claim 7, wherein said method further comprises:

determining whether any events are pending in the event queue container.

15. A method for managing flow of messages in a computer system having a synchronization queue suitable for holding one or more message blocks while the one or more message blocks are awaiting to be processed, said synchronization queue comprising an event queue that is used only for storing and dynamic processing within the event queue at least one message block pertaining to an operational event and a second synchronization data queue suitable for storing at least one message block not pertaining to an operational event, said method comprising:

(a) determining whether a message pertains to an operational event;

(b) placing the message in the event queue of said synchronization queue when said determining (a) determines that the message pertains to an operational event;

(c) placing the message in the data queue of said synchronization queue when said determining (a) determines that the message does not pertain to an operational event; and reading a synchronization queue header that provides references to both the event queue and the data queue in order to respectively place messages in the event queue and the data queue.

16. A method as recited in claim 15, wherein said synchronization queue comprises a plurality of data queues, and wherein said method further comprises:

determining an appropriate data queue of said synchronization queue to place the message when said determining (a) determines that the message does not pertain to an operational event; and placing the message in the appropriate data queue of said synchronization queue when said determining (a) determines that the message does not pertain to an operational event.

17. A method as recited in claim 16, wherein said method further comprises:

determining whether the appropriate data queue is empty;

propagating the message when said determining determines that the appropriate data queue is empty; and placing the message at the end of the appropriate data queue when said determining determines that the data queue is not empty.

18. A method as recited in claim 15, wherein said method further comprises:

obtaining a first message from the appropriate data queue; and propagating the message when said determining determines that the appropriate data queue is empty.

19. A computer readable media including computer program code for managing flow of messages between a first software module and a second software module, said computer readable media comprising;

computer program code for receiving a message that is to be stored and dynamically processed in a synchronization queue that stores messages that are awaiting to be processed in a main queue that facilitates processing of messages between the first software module and a second software module, wherein the synchronization queue includes at least one event queue and at least one data queue, wherein the at least one event queue is used to store and dynamically process only messages relating to events, and two or more data queues that are not used to store messages that are relating to event;

computer program code for determining whether the message pertains to an operational event;

computer program code for placing the message in the event queue associated with the first software module when said computer program code for determining determines that the message pertains to an operational event; and computer program code for placing the message in an appropriate data queue associated with the first software module when said computer program code for determining determines that the message does not pertain to an operational event.

20. A computer readable media as recited in claim 19, wherein said computer program code for placing the message in an event queue associated with the first software module comprises:

computer program code for determining the appropriate data queue to place the message; and computer program code for placing the message at the end of the appropriate data queue.

21. A computer readable media as recited in claim 19, wherein said computer readable media further comprises:

computer program code for determining whether the appropriate data queue is empty;

computer program code for passing the message to the second layer software module when the determining determines that the appropriate data queue is empty; and computer program code for placing the message at the end of the appropriate data queue when the determining determines that the data queue is not empty.

22. A computer readable media as recited in claim 21, wherein said computer readable media further comprises:

computer program code for obtaining a first message from the appropriate data queue; and computer program code for passing the first message the second layer software module.

23. A computer readable media as recited in claim 19, wherein said computer readable media further comprises:

computer program code for obtaining a first message from the appropriate data queue; and computer program code for passing the first message to the second layer software module.

* * * * *